J. SCHEIDER.
Spoons and Ladles.
No. 200,670.    Patented Feb. 26, 1878.
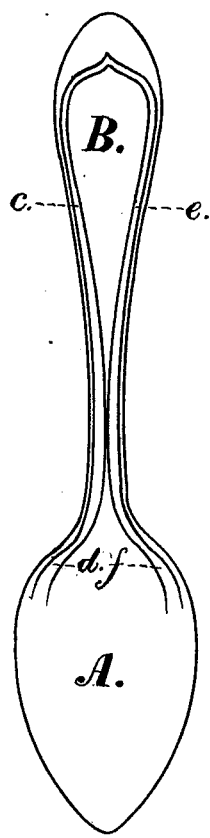
Witnesses:
Geo. M. Baker
F. L. Stinel.
Inventor:
Joseph Scheider

UNITED STATES PATENT OFFICE.

JOSEPH SCHEIDER, OF NEW YORK, N. Y.

IMPROVEMENT IN SPOONS AND LADLES.

Specification forming part of Letters Patent No. 200,670, dated February 26, 1878; application filed January 2, 1878.

*To all whom it may concern:*

Be it known that I, JOSEPH SCHEIDER, of the city, county, and State of New York, have invented a certain Improvement in Spoons and Ladles, of which the following is a specification:

My invention relates especially to that class of spoons and ladles which are stamped by dies out of a single blank of metal; but it also applies to such articles when manufactured out of thin metal in other ways.

It has been found that the point of junction of the bowl of the spoon or ladle with the handle and the very end of the handle are the weak parts of such spoons and ladles.

Various expedients have been adopted to remedy these defects, such as making the point of junction of the handle with the bowl thicker than the rest of the spoon, or running a corrugation along the center of the handle, so that it will end in the central part of the bowl by tapering sidewise and flatwise in contradistinction to spreading sidewise, as described in Letters Patent granted to Grosjean in 1867.

My invention is designed to give the requisite strength in a substantially different and better way, and at the same time to obviate one great drawback to the introduction of the spoons last described into general use, namely this: It has been found that the sharp angles formed by a corrugation where it ends in the deepest part of the bowl of a spoon, as described in said patent of Grosjean, secrete particles of food, and thus, from the difficulty of proper cleaning, and the carelessness of the class of people who use such cheap articles, these spoons soon become foul.

My invention consists in the use of two corrugations in such a way that the bowl of the spoon contains no deep and sharp angles, which can retain particles of food, and not only is the point of junction of the handle with the bowl strengthened, but also the edges of the bowl at the back, and the handle itself.

In the figure, A is the bowl of the spoon invented by me. B is the handle. *c d* and *e f* are two hollow beads or corrugations or branches of one corrugation, which strengthen the weak parts of the spoon in the following manner: At the end of the handle farthest from the bowl, and where the handle begins to flare, these corrugations or branches separate, and, running around the edge of the handle, leave a space between them for the perforation common in ladles. At the other end of the handle, and above the point where it joins the bowl, these corrugations or branches again separate and run into the bowl of the spoon along its edges, so that the concave curve of the bowl runs up between them into the handle. The corrugations then spread sidewise, and disappear gradually in the curve of the bowl. Thus no sharp angles occur in which food can readily collect.

By the use of two corrugations I also not only strengthen better the point of junction aforesaid, but I also strengthen the weak edges at the back of the bowl and the handle itself against twisting, which is not accomplished by a single corrugation, and thus lighter and cheaper metal can be used.

I am aware that a corrugation in the handle of a spoon or ladle is old, as shown in the patent of Grosjean, January 28, 1862, and I do not claim this as my invention; nor do I claim merely the use of two corrugations instead of one in the handle.

I am also aware that the sheet metal at the back of the bowl of a spoon and at the sides of the handle has been turned downward in the form of flanges, in order to impart strength, as shown in the original and reissued patents of Milligan, dated February 4, 1862, and October 23, 1877. This also I disclaim, since in that device a deep hollow is formed on each side, in which food will collect; but

I claim as my invention—

A sheet-metal spoon or ladle made of a single undoubled piece of metal, having two corrugations or branches of a corrugation running along the sides of the bowl below its edge, one along each side, and approaching one another at the point of junction of the handle with the bowl, and running up into the handle in such manner that the concave curve of the bowl extends between them into the handle, substantially as set forth.

JOSEPH SCHEIDER.

Witnesses:
GEO. M. BAKER,
F. L. STINEL.